Aug. 5, 1958  R. REQUA ET AL  2,846,039
CAM OPERATED TRANSVERSELY MOVING POSITIVE PAWL CLUTCH
Filed June 16, 1955  2 Sheets-Sheet 2
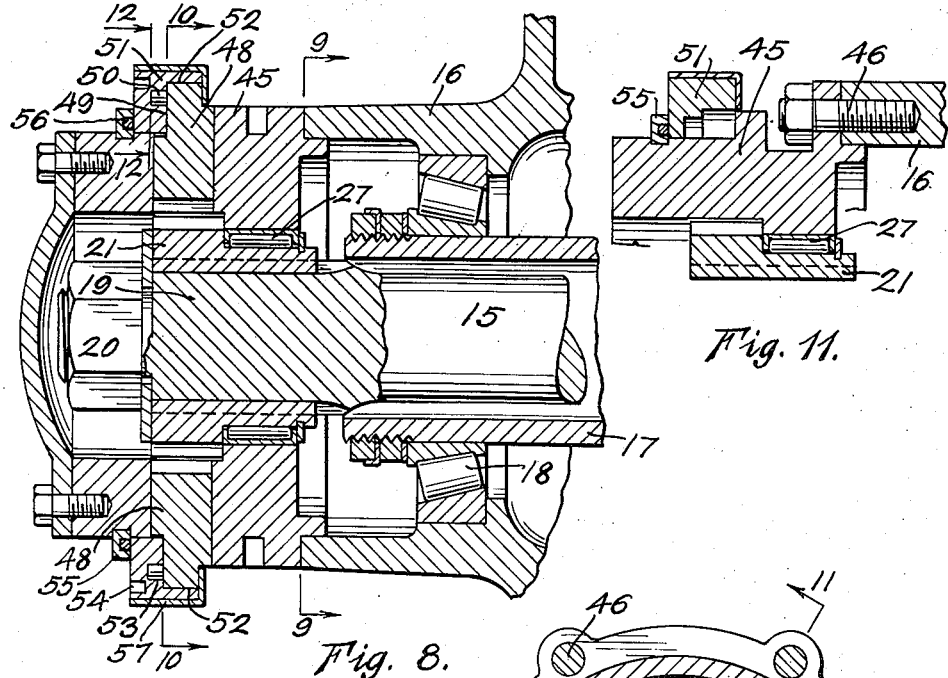
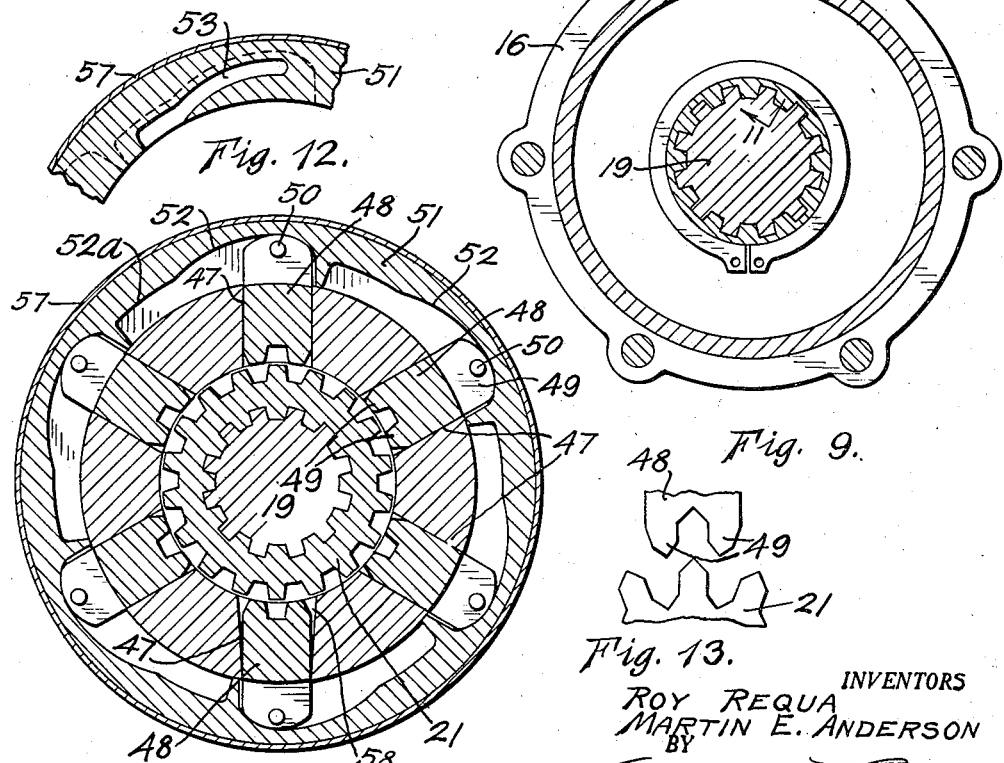
INVENTORS
ROY REQUA
MARTIN E. ANDERSON
BY
ATTORNEYS

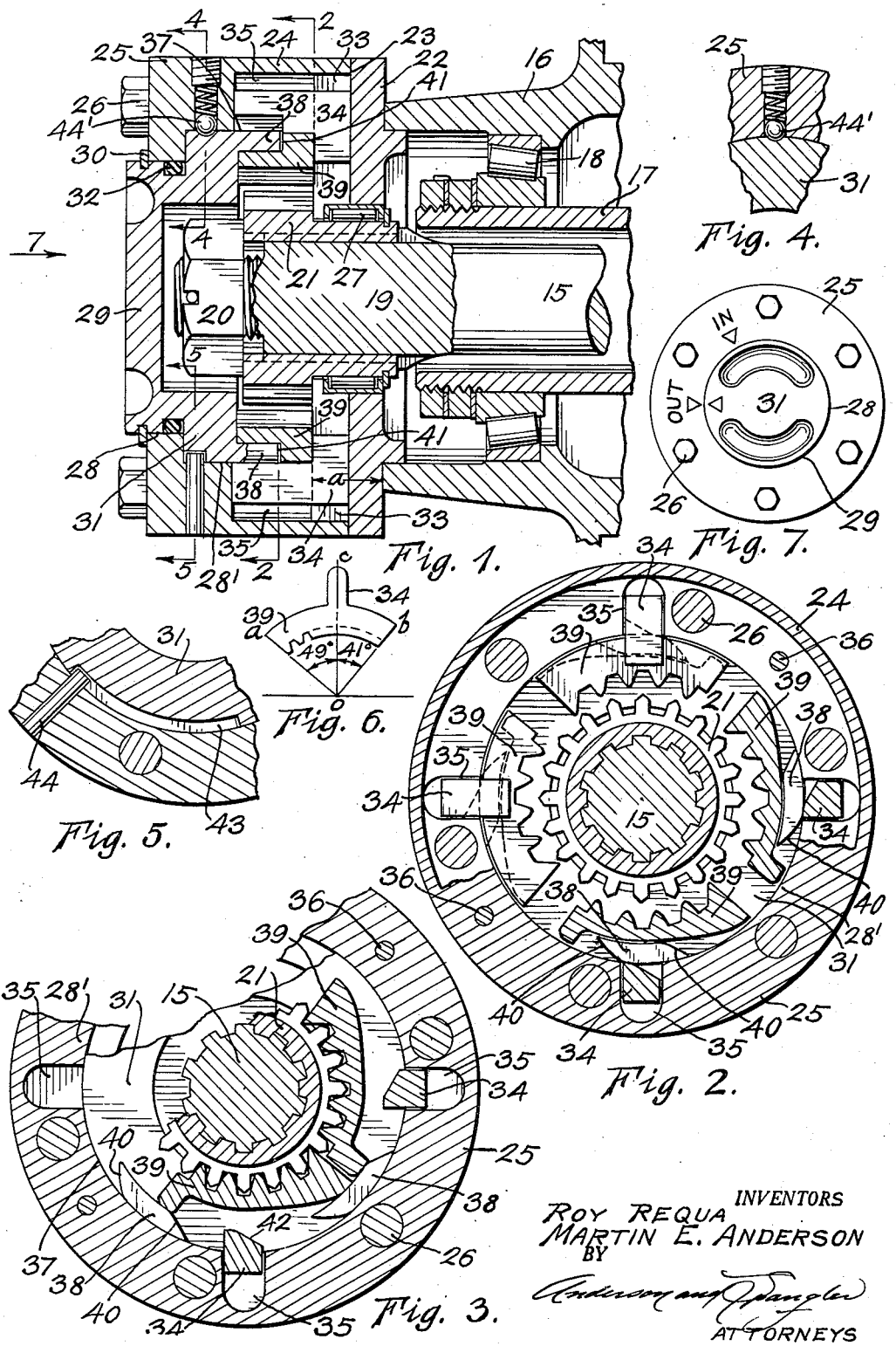

United States Patent Office 2,846,039
Patented Aug. 5, 1958

2,846,039

CAM OPERATED TRANVERSELY MOVING POSITIVE PAWL CLUTCH

Roy Requa and Martin E. Anderson, Denver, Colo.; said Requa assignor to Free Lock Corporation, Denver, Colo.

Application June 16, 1955, Serial No. 515,994

12 Claims. (Cl. 192—71)

This invention relates to improvements in clutches; and has reference in greater particular to a manually operated clutch for alternately connecting and disconnecting a drive shaft and a wheel or pulley mounted on the shaft.

In many different machines it is necessary to connect a wheel or pulley to, and to disconnect it from, a drive shaft and many clutches have been designed for that purpose. If the wheel or pulley is attached to a shaft near its end and outside of the corresponding end bearing the problem is different from that if the wheel or pulley is positioned at an intermediate portion of the shaft between two bearings.

This invention relates in particular to a clutch for effecting and disconnecting a driving connection between a wheel positioned adjacent the end of the drive shaft specifically, the invention relates to automobiles having auxiliary front wheel drives and will be illustrated and described in connection with the vehicle known by the name "Jeep" which is representative of this type.

It is the object of this invention to produce a clutch for the purpose specified which shall be of simple and rugged construction.

A further object is to produce a clutch for the purpose specified that can be readily sealed against the entrance of dirt and moisture, which will also retain lubricant, and can, therefore, be packed with suitable lubricant.

A still further object is to produce a clutch having pawls that move radially instead of longitudinally.

Another object is to produce a clutch which can be readily moved into operative position.

Another object of the invention is to produce a clutch with radially movable pawls having cam means for positively moving the pawls between operative and inoperative positions.

The above and other objects that may become apparent as the description proceeds and/or to which attention may be directed are attained by means of a construction and arrangement of parts that will be described in detail in the following parts of the specification for which purpose reference will now be had to the accompanying drawings in which the invention has been illustrated and in which:

Figure 1 is a diametrical longitudinal section showing the clutch in its operative relation to the drive shaft and wheel hub;

Figure 2 is a section taken on line 2—2 Figure 1;

Figure 3 is a fragmentary section taken on the same line as Figure 2 but showing the pawls in latching position;

Figure 4 is a section taken on line 4—4 Figure 1 and shows the spring pressed ball detent from a different side than that shown in Figure 1;

Figure 5 is a section taken on line 5—5 Figure 1 and shows a limit stop;

Figure 6 is a diagrammatic representation of a pawl illustrating its unsymmetrical construction;

Figure 7 is a view looking in the direction of arrow 7 in Figure 1 and shows the end of the pawl operating member;

Figure 8 is a longitudinal diametrical section similar to Figure 1 and shows a modified construction;

Figure 9 is a transverse section taken on line 9—9 Figure 1;

Figure 10 is a transverse section taken on line 10—10 Figure 1;

Figure 11 is a section taken on line 11—11 Figure 9 and shows the manner in which the clutch is attached to the wheel hub;

Figure 12 is a section taken on line 12—12 Figure 1 and shows the cam groove for moving the pawls outwardly; and, Figure 13 is a fragmentary view showing one form of tooth suitable for the invention.

Referring now to the drawings, reference numeral 15 designates the drive shaft of a front wheel drive and numeral 16 designates the hub of the wheel which is mounted for rotation on axle housing 17 by means of bearings 18, one of which is shown. The shaft has a splined section 19 near its end and this terminates in a threaded section for nut 20. Positioned on the splined section is a tubular clutch member 21 that is held in place by nut 20 and which has longitudinal teeth on its outer end portion. A tubular housing 25 has an inner end portion on member 22 positioned against the end of the hub and is provided with a peripheral rabbet 23 for the reception of the end of the cylindrical member 24 of the tubular housing 25. Bolts 26 secure members 22 and 24 of the housing 25 together and to the end of the hub as shown in Figures 2 and 9. The inner end 22 of the housing has a central opening containing a needle bearing 27 in which is journaled the cylindrical end of the tubular clutch member. The outer end of the housing 25 has an axial opening 28 in which is positioned the circular hub 29 that is held in place by snap ring 30 and which forms part of the pawl operating cam carrying member 31. A grease seal 32 serves to prevent the escape of grease with which the device is packed. Housing member 22 is shown as having four radial guides 33 in each of which is positioned a pawl having a flat portion 34 that slides radially in guides 33 in member 22 and in the complemental radial guides 35 in the tubular housing 25. Members or parts 22 and 24 are each provided with six holes for the reception of the bolts 26 which are used to attach the clutch to the hub. Members 22 and 24 are preferably provided with two cooperating sets of dowel pins and holes, represented by reference numeral 36, which are either positioned different distances from the center or in non-diametrical positions so that the parts can be assembled in one rotarial position only. Housing members 22 and 24 are cylindrical or of circular cross section as shown in Figures 2 and 3. Member 22 has a thickness *a* (Figure 1) and four radial guides 33 that are positioned 90 degrees apart and register with the guides 35 in member 24. Housing 25 has an axial opening 28 to which attention has already been called, and inwardly of this opening the interior of the housing has a section of enlarged diameter, the wall thereof being designated by reference numeral 28'. The pawl operating cam carrying member 31 embodies the circular hub portion 29 that projects through opening 28 (Figure 1) and a cylindrical wall 37 of larger diameter that fits against wall 28'. Projecting inwardly (towards the right in Figure 1) are four identical cam elements 38 which have inner and outer radially spaced camming surfaces that move the pawls 34 radially. Each pawl has an arcuate toothed latching head 39 that rests on the annular surface of the pawl operating member as shown most clearly in Figure 1. The teeth are so designed that they will enter between the longitudinal teeth on the outer end portion of the clutch member 21 when moved inwardly. The shape of the pawls can be best understood from Figures 2 and 3.

Attention is called at this point to Figure 6 from which it will be seen that the arcuate toothed portion 39 is not bisected by te radial median line o—c of part 34 but that this line divides angle a—o—b into two unequal angles a—o—c and b—o—c the former being equal to 49 degrees and the latter to 41 degrees. These angles are not critical but have been found to be the most satisfactory of those tried. The offset arrangement of the toothed latching head makes it possible to mesh the pawl teeth with the teeth on outer surface of the clutch member 21 at all times because if the parts are angularly misplaced the teeth will cooperate to effect an angular adjustment sufficient to effect a satisfactory interlock. The pawls are moved radially by means of the cam elements 38 the ends of which are inclined as shown at 40. Each of the pawls 34 embodies in addition to the arcuate toothed portion 39 hereinbefore referred to, a middle or intermediate portion which rises from the back or convex side of the arcuate toothed portion and which has extending from it axially of the tubular housing and in spaced relation with the arcuate back surface of the toothed portion a finger which slides in the groove 35 adjacent thereto. As is clearly shown in Figs. 2 and 3, the thickness of the middle portion of the pawl and of the axially extending finger is materially less than the length of the arcuate portion 39 and also it will be seen upon reference particularly to Fig. 3 that the convex back of each arcuate portion 39 is eccentric to the shaft or to the axis of the housing and is spaced from the adjacent side of the pawl carried finger, thus providing an area 41 through which the cams 38 move or pass in the actuation of the pawls by the clockwise or counter-clockwise turning of the hub 29 and, therefore, of the cam carrying member 31. It will also be apparent upon reference to Fig. 3 that the cams in moving back and forth through the area 41 completely pass the axially extending finger portions which are spaced from the convex back of the arcuate portion 39. The opposing surfaces of the fingers and the arcuate portions of the pawls, therefore, provide camming surfaces and the radially spaced arcuate faces of the cams provide camming means which alternately engage these camming surfaces. Upon reference to Figs. 2 and 3 it will be be seen that when the cams 38 are in the position shown in Fig. 2 relative to the camming surfaces of the pawls an outward thrust will be applied to the finger portions of the pawls by the outer sides or camming means of the cam element and disengagement of the teeth of the pawls from the longitudinal teeth of the body 21 will be effected. This action occurs when the member 31 is turned clockwise and when the cam carrying member is turned counter-clockwise to the position shown in Fig. 3 thrust will be applied to the eccentric convex faces of the arcuate members to move the pawls into engagement with the member 21. The angular extent of member 39 is such that when the pawls are in the positions shown in Figure 3 the latching heads form a complete circle and a cam element 38 covers adjacent ends of the latching heads thus preventing radial outward movement thereof. When, however, the cam elements 38 are turned in a clockwise direction from the operative position of Figure 2 to that shown in Figure 3 they engage the inclined surfaces 42 of members 34 and move the parts to disengaged position.

Referring now to Figure 5 it will be seen that the pawl operating cam carrying member 31 has an arcuate groove 43 and that cylindrical member 24 has a pin 44 that projects into the groove cooperating with the end walls thereof to limit the angular movement of said member to that required for the reciprocation of the pawls. A spring pressed ball detent 44' functions to hold the pawl operating cam member 31 in its operative and inoperative positions.

In Figures 8 through 13, inclusive, a modified construction has been shown which will now be described. A tubular housing 45 is attached at one end to the wheel hub 16 by bolts 46 as shown in Figure 11. Housing 45 contains an axial cylindrical opening comprising two sections of different internal diameter. A needle bearing 27 is carried on the wall of the smaller diameter part of the opening and the cylindrical inner end of the tubular toothed clutch member is journaled therein. Member 45 has been shown as having six radial guide openings 47 spaced angularly 60 degrees apart. In each guide opening a pawl 48 is mounted for radial reciprocation. The inner ends of the pawls have been shown as provided with two teeth 49 sized and positioned to engage between corresponding teeth of the clutch member 21. The teeth are preferably shaped as shown in Figure 13 to reduce to a minimum any outwardly acting force component. Although six pawls have been shown any number from one to six can be used; and, as a practical matter, the pawls should be arranged in diametrical pairs. The pawls are preferably of square or rectangular cross section and are provided on their outer side surfaces (surfaces facing to the left in Figure 8) with a set-back 49, from which a pin 50 projects outwardly. Surrounding the tubular housing is a cam ring 51 which is positioned outside of the pawls and each pawl is provided on its inner surface with a slot having a radially inwardly directed contoured bottom wall cam means 52. The cam surfaces engage the outer camming surface ends of the pawls is shown in Figure 10. The camming means 52 terminate at their left ends (Figure 10) in short sections 52a that are concentric with the shaft and engage the outer camming surface ends of the pawls when the latter are in latching or operative position. Since the sections 52a are concentric with the shaft the outward pressure of the pawls, if any, produces no rotary component. When ring 51 is turned clockwise the pawls move inward towards the clutch member. When, however, the pawls are to be withdrawn, the cam ring is rotated counter-clockwise and has a cam slot 53 that receives the pin which moves the pawls outwardly to the position shown in Figure 10. The cam ring has two diametrically positioned holes 54 adapted to receive a spanner wrench. A snap ring 55 is positioned in a groove in the outer surface of member 45. A grease seal 56 is positioned between the snap ring and the cam ring. A ring 57 covers the peripheral surface of ring 51 and serves to keep dirt and dust from entering the clutch.

Since it may happen that the wheel and axle stop in a position such that the teeth 49 of the pawl will engage a tooth on member 21, the teeth of the pawl and member 21 are pointed, as shown in Figure 13, in order to produce a slight relative rotation because of the fact that the gears of the transmission that turn the shaft always have a small amount of play which will permit the dead-centered teeth to move into meshing relation. Another way of assuring ease in effecting meshing is to taper holes 47 outwardly as shown at 58 in Figure 10. It is to be understood that grease seals and seals to prevent the entry of dirt or water can be provided wherever necessary.

Since clutches for transmitting torque from a drive shaft to the front drive wheels are subjected to very heavy strains, they must be constructed so ruggedly that they will withstand the maximum torque strain with a high factor of safety. With the construction shown in Figures 1, 2 and 3 the toothed inner ends of the pawls are so constructed that each subtends an angle of 90° in order that the pawls will form a complete circle about the tubular clutch member 21 and thus providing the maximum strength for resisting the heavy torque strains. The toothed ends of pawls 48 in Figure 10 may be modified to obtain the advantages of the arrangement shown in Figure 3. Since the clutch interlock must frequently be disengaged while the parts are under heavy strain it is essential that the pawls can be moved outwardly by positive means as above described.

What is claimed as new is:

1. As an article of manufacture, a cam member for simulataneously moving a plurality of radially slidable angularly spaced pawls to and from operative position, comprising: a cylindrical plug having an outer surface formed from two concentric cylindrical sections of different diameters joined by an annular surface, the outer end of the section of greater diameter having at least two arcuate concentric cam elements projecting therefrom in the direction of the plug axis, the cam elements having radially spaced concentric inner and outer curved surfaces, corresponding ends of the cam elements being inclined inwardly and away from corresponding radii, and the other ends being inclined inwardly and towards corresponding radii.

2. A cam member in accordance with claim 1 in which there are more than two cam elements equiangularly spaced.

3. A cam member in accordance with claim 1, in which there are an even number of cam elements arranged in diametrical pairs.

4. As an article of manufacture, a cam member for use in simultaneously moving a plurality of radially slidable, angularly spaced pawls into and out of operative position, comprising: a cylindrical plug having its outer surface formed from two cylindrical sections of different diameters joined by an annular wall, the outer end of the section of greater diameter having a plurality of angularly spaced cam elements projecting therefrom in the direction of the plug axis and positioned adjacent the peripheral edge thereof, the cam elements having radially spaced, concentrically curved inner and outer surfaces, corresponding ends of the cam elements being inclined inwardly and towards corresponding radii, and the other ends being inclined inwardly and away from corresponding radii.

5. A clutch for effecting a driving connection between an end of a power shaft and a wheel hub wherein the hub encircles and is rotatably mounted on the shaft and the shaft has an end portion extending beyond an end of the hub; a tubular housing having an inner end adapted to be secured to and coaxial with the said end of the hub and having an inner end opening through which the shaft end portion extends into the housing, a bearing secured in said end opening of the housing and adapted to encircle and be supported on the shaft, tooth forming means carried by and extending longitudinally of the shaft end within the housing, means providing radial guides within the housing and around the toothed end of the shaft, pawls slidable in said guides and carrying teeth adapted on inward movement of the pawls for interengagement with said shaft teeth, a first camming surface on each pawl for receiving radial inward camming thrust, a second camming surface on each pawl for receiving radial outward camming thrust, an annular cam carrying member supported on and concentric with the tubular housing for limited rotation relative to the housing, a first cam means on said member for engaging each pawl and adapted to apply thrust to the said first camming surface thereof upon rotation in one direction, a second cam means on said member for each pawl and adapted to apply thrust to the said second camming surface thereof on reverse rotation of the member, and means for facilitating manual rotation of the annular cam carrying member.

6. The invention according to claim 5, wherein said annular cam carrying member is positioned in and closes the outer end of the tubular housing and the said first and second cam means are embodied in elements which project axially inwardly from the carrying member.

7. The invention according to claim 6, wherein the first and second camming surfaces of each pawl are opposed radially spaced surfaces over which the first and second cam means alternately ride in the alternate rotations of the cam carrying member.

8. The invention according to claim 5, wherein each pawl embodies a radially directed middle part, an arcuate inner part extending across the inner end of the middle part and having said teeth on its concave side, and an axially directed finger on the outer end of the middle part, the convex side of the arcuate part and a side of the finger being in radially spaced opposed relation and forming the said first and second camming surfaces.

9. The invention according to claim 8, wherein said annular cam carrying member is positioned in and closes the outer end of the tubular housing and the said first and second cam means are embodied in elements which project axially inwardly and are positioned to alternately engage said first and second cam means in the alternate rotations of the cam carrying body.

10. The invention according to claim 8, wherein the said arcuate parts of the pawls are formed to have their adjacent ends substantially meet when the pawls are moved inwardly to toothed interengagement with the shaft carried teeth to form an annulus around the shaft end, the said annular cam carrying member being positioned in and closing the outer end of the tubular housing and the said first and second cam means being embodied in elements projecting axially inwardly and positioned to alternately engage the first and second cam means in the alternate rotations of the cam carrying body, and said elements when the pawls have been moved inwardly each bridging two said adjacent ends of said arcuate parts between the latter and an encircling wall of the housing to prevent outward movement of the pawls.

11. The invention according to claim 5, wherein said annular cam carrying member encircles the tubular housing and the first camming surface is directed radially outwardly, each pawl carrying a laterally extending pin a surface portion of which pin forms the second camming surface, said first cam means comprising a radially inwardly directed contoured bottom wall of a slot formed in the inner side of the annular cam carrying member and having said first camming surface constantly in engagement therewith and said second cam means comprising a contoured slot in a side wall of the first slot and having said pin engaged therein.

12. The invention according to claim 11, wherein an end portion of each contoured wall is curved concentrically with the shaft and an opposite end portion of the wall is curved eccentrically and the concentrically curved portion being spaced radially from the pawl engaging teeth of the shaft a distance substantially equal to the radial extent of the pawl whereby to maintain a locked coupling between the pawls and the tooth forming means on the shaft.

References Cited in the file of this patent

UNITED STATES PATENTS

| Re. 8,524 | Remington | Dec. 17, 1898 |
| 283,459 | Bapple | Aug. 21, 1883 |
| 371,853 | Potter | Oct. 18, 1887 |
| 2,684,140 | Warn | July 20, 1954 |
| 2,727,406 | Opocensky | Dec. 20, 1955 |